United States Patent [19]

Brooks

[11] Patent Number: 5,153,261

[45] Date of Patent: Oct. 6, 1992

[54] POLYESTER-POLYURETHANE HYBRID RESIN MOLDING COMPOSITIONS

[75] Inventor: Gary T. Brooks, Naperville, Ill.

[73] Assignee: Amoco Corporation, Chicago, Ill.

[21] Appl. No.: 575,069

[22] Filed: Aug. 30, 1990

[51] Int. Cl.$^5$ .................... C08F 295/00; C08L 67/02; C08L 75/04

[52] U.S. Cl. .................... 525/28; 525/29; 525/440; 525/445

[58] Field of Search .................... 525/28, 440, 445, 29

[56] References Cited

U.S. PATENT DOCUMENTS

| | | | |
|---|---|---|---|
| 4,296,020 | 10/1981 | Magrans, Jr. | 260/37 N |
| 4,868,231 | 9/1989 | Lenke et al. | 523/512 |
| 4,880,872 | 11/1989 | Thomas | 525/28 |

OTHER PUBLICATIONS

Edwards, H. R. "Handling and Physical Properties of Hybrid Polyesters", 39th Ann. Conf. Reinforced Plastics/Composites Institute, The Society of the Plastics Industry, Inc. Jan. 16–19, (1984), pp. 1–8.

Primary Examiner—James J. Seidleck
Assistant Examiner—Thomas Hamilton, III
Attorney, Agent, or Firm—Rae K. Stuhlmacher; William H. Magidson; Frank J. Sroka

[57] ABSTRACT

Polyester-polyurethane hybrid resin molding compositions having a first, soft polyurea phase within a second, more rigid polyester-polyurethane phase are disclosed. The compositions are formed by the reaction of an A side composition and a B side composition. The A side composition comprises a polyfunctional isocyanate compound and a free radical polymerization catalyst. The B side composition comprises a mixture of (i) an ethylenically unsaturated monomer solution having dissolved therein about 40–90 weight percent of a substantially water-free, unsaturated polyester polyol having at least one dicarboxylic alkene moiety and having an acid number less than five; and (ii) a polyfunctional nitrogen-containing compound having at least one active hydrogen atom on each of at least two nitrogen atoms in each molecule, which, when reacted with the A side composition, has a molecular weight sufficient to form the first, soft polyurea phase. The A and B side compositions, which are reacted at the time of molding, have a ratio of active NCO groups of the isocyanate to NH groups of the nitrogen-containing compound of between about 3:1 to about 100:1, a ratio of active NCO groups to active OH groups in the polyester polyol of between about 0.5:1 and about 6:1, such that the stoichiometric index NCO:(NH+OH) is between about 0.5 and about 2.0.

20 Claims, No Drawings

POLYESTER-POLYURETHANE HYBRID RESIN MOLDING COMPOSITIONS

This invention relates to polyester-polyurethane hybrid resin molding compositions. More specifically, this invention relates to polyester-polyurethane hybrid resin molding compositions which have been modified by the addition of certain polyfunctional nitrogen-containing compounds, resulting in the in situ formation of a first, soft polyurea phase within a second, more rigid polyester-polyurethane phase which provides improved properties.

BACKGROUND OF THE INVENTION

Polyester-polyurethane hybrid resins are well-known in the art of thermoset molding compositions. These resins are normally tougher than polyesters and stronger, stiffer and less expensive than polyurethanes. Such hybrid resins usually comprise a hydroxy-terminated unsaturated polyester polyol, an ethylenically unsaturated monomer such as styrene and a polyisocyanate. They can be easily adapted to many common thermoset molding techniques employed in polyurethane and unsaturated polyester industries. Such hybrid resins are commercially available from Amoco Chemical Company under the trademark Xycon hybrid resins and are supplied as two component systems having an A and a B side. The A side contains the polyisocyanate and a polyester catalyst, while the B side contains the hydroxy-terminated unsaturated polyester polyol/styrene solution and optionally a polyurethane catalyst and/or filler.

Hybrid resins can be tailored to improve toughness and thermal properties of molded articles made from the resins. The balance between these two properties is dictated in part by the crosslink density within the hybrid. The greater the crosslink density, the higher the heat deflection temperature and glass transition temperature, i.e., thermal properties, but the lower the toughness. Toughness improvements can also be achieved by the addition of flexible moieties, such as ether groups into the polymer backbone, although at a sacrifice in thermal properties. It is desirable to improve the toughness of the hybrid without significantly reducing its thermal properties.

It is also desirable to reduce the shrinkage and improve the surface appearance of molded articles manufactured from hybrid resins. Shrinkage usually occurs during cure and can result in dimensional stability problems, such as warpage. Unacceptable surface appearances such as waviness or roughness may occur when hybrids are reinforced with fibers, such as glass, due to the fibers rising to the surface of the molded article. This phenomenon is commonly termed glass print-through.

It is further desirable to reduce the shrinkage of hybrid resins without having to add excess styrene. Excess styrene may be introduced when a low profile additive (LPA) is added to the hybrid to control shrinkage and improve dimensional stability and surface smoothness. An LPA is usually a thermoplastic polymer such as a vinyl acetate polymer, acrylic polymer, polyurethane polymer, polystyrene, butadiene styrene copolymer, saturated polyester and polycaprolactone. These are typically non-reactive polymers (non-reactive end groups) of high molecular weights (10,000 to 200,000), which are supplied in a vinyl monomer such as styrene to reduce the viscosity of the thermoplastic to a workable range. The LPA tends to phase separate from the polyester during cure, resulting in thermoplastic domains that induce stresses within the system. These stresses result in microcracks and microvoids in molded products containing the LPA. These internal imperfections reduce the amount of shrinkage that occurs during cure, but have the drawback of weakening the polyester matrix. Another drawback associated with the use of an LPA is the quantity of styrene required to achieve a sufficient amount of thermoplastic to produce a low profile effect in the thermoset. Typical LPA-modified polyesters contain up to about 50-60 weight percent styrene monomer. When there is more than 1 mole of styrene per equivalent of unsaturation in the polyester, the product has a tendency to have high shrinkages. However, these shrinkages are somewhat counterbalanced by the micro-imperfections developed during the phase separation of the thermoplastic from the thermoset.

The prior art, such as U.S. Pat. No. 4,822,849, teaches reducing the shrinkage of hybrid resins by reducing both the styrene level and unsaturation level within the hybrid. Lower shrinkage is achieved by reducing the crosslink density, but, as described above, this may lead to reduced thermal properties of the hybrid resin. The prior art, including U.S. Pat. No. 4,280,979, also describes the preparation of unsaturated polyester diols which can be reacted with a polyisocyanate and a polymerizable ethylenically unsaturated monomer to produce polyurethane/vinyl copolymers. Both patents are incorporated herein by reference.

Also the prior art, such as U.S. Pat. Nos. 4,310,448, 4,305,857, 4,093,569, 4,310,449, 4,147,680 and 4,305,858, teaches preparation of dispersions of polyisocyanate polyaddition products in compounds having hydroxyl groups. These patents teach the reaction of an organic polyisocyanate and compounds having primary and/or secondary amino groups and/or hydroxyl groups and/or ammonia in compounds having at least one hydroxyl group. All of these patents teach carrying out the reaction in the presence of more than 2 percent by weight of water, a polymer latex or in a solution of an ionic polyurethane. These patents further teach that it is preferred to react approximately equivalent quantities of isocyanates and amino functional compounds. It is stated that a limited excess of isocyanate may also be used, but the products then obtained have a high viscosity due to the isocyanate reacting with the dispersing agent, which apparently is undesirable for the described polyaddition products. The present invention teaches the preparation of two phase molding compositions which are prepared in a substantially water-free polyol solution with an excess of isocyanate (between about 3:1 and about 100:1). It is undesirable in the present invention to use water because water will react with the isocyanate resulting in an undesirable foam product. It has further been found that the use of an excess of isocyanate has unexpected advantages of improved shrinkage, surface and impact properties in the disclosed molding compositions.

For the purpose of this disclosure, the term "cure" or "curing" means the transformation of the hybrid resin system from a liquid to a gel or solid state. This curing occurs at the time of molding by cross-linking of the reactive sites in the hybrid system, including the reaction of the isocyanate with active hydrogen-containing compounds. Further, the curing of the hybrid resin system occurs via the vinyl addition reaction between the ethylenically unsaturated monomer and the unsaturated polyester polyol. Depending on the catalyst employed, curing can optimally occur at the time of molding at temperatures of about 25° C. to about 150° C. for a time of about 10 mins to about 24 hrs.

As used herein, the term "stoichiometric index" refers to the value obtained by dividing the number of active NCO groups of the isocyanate compound by the sum of the active NH plus OH groups of the nitrogen-containing compound and the polyester polyol of the invention, i.e., NCO:(NH+OH). The term "substantially water-free", as used herein, means a water content of less than 1 percent, preferably less than 0.2 percent and most preferably less than 0.05 percent. The term "polyfunctional", as used herein, is intended to include functionalities of two or greater.

It is an object of the present invention to provide novel hybrid resin molding compositions having a first, soft polyurea phase within a second, more rigid polyester-polyurethane phase. It is another object of this invention to provide a hybrid resin that offers improved shrinkage control. It is yet another object to provide an improved molding composition which has improved impact strength without significantly sacrificing thermal properties, resulting in a novel balance of thermal/impact properties. It is a further object to provide a polyester-polyurethane hybrid resin molding composition which offers improved surface properties in molded articles manufactured therefrom and at a faster gel time.

To accomplish the above objects, the invention provides novel two phase molding compositions and processes for making improved molding compositions. In yet another aspect, the invention enables hybrid resin systems having an A and a B side, which, when reacted, provides improved two phase molded products.

SUMMARY OF THE INVENTION

The polyester-polyurethane molding compositions of the invention are molded products having a first, soft polyurea phase within a second, more rigid polyester-polyurethane phase, and are formed by the reaction of an A side composition and a B side composition. The A side composition comprises a polyfunctional isocyanate compound and a free radical polymerization catalyst. The B side composition comprises a mixture of (i) an ethylenically unsaturated monomer solution having dissolved therein about 40-90 weight percent of a substantially water-free, unsaturated polyester polyol having one or more dicarboxylic alkene moieties and having an acid number less than five; and (ii) a polyfunctional nitrogen-containing compound having at least one active hydrogen atom on each of at least two nitrogen atoms in each molecule, which, when reacted with the A side composition, has a molecular weight sufficient to form the first, soft polyurea phase. The A and B side compositions, which are reacted at the time of molding, have a ratio of active NCO groups of the isocyanate to NH groups of the nitrogen-containing compound of between about 3:1 to about 100:1, a ratio of active NCO groups to active OH groups in the polyester polyol of between about 0.5:1 and about 6:1, such that the stoichiometric index NCO:(NH+OH) is between about 0.5 and about 2.0.

The process for making the two phase polyester-polyurethane molding compositions of the invention comprises reacting:

(1) an A side composition comprising a polyfunctional isocyanate and a free radical polymerization catalyst; and (2) a B side composition comprising a mixture of:

(i) An ethylenically unsaturated monomer solution having dissolved therein about 40-90 weight percent of a substantially water-free, unsaturated polyester polyol having one or more dicarboxylic alkene moieties and having an acid number less than five; and (ii) A polyfunctional nitrogen-containing compound having at least one active hydrogen atom on each of at least two nitrogen atoms in each molecule, which, when reacted with the A side composition, has a molecular weight sufficient to form the first, soft polyurea phase; wherein the ratios of active NCO groups of the isocyanate to active NH groups of the nitrogen-containing compound is between about 3:1 and about 100:1, and the NCO groups to active OH groups of the polyester polyol is between about 0.5:1 and about 6:1, such that the stoichiometric index NCO:(NH+OH) is between about 0.5 and about 2.0.

The invention further comprises a polyester-polyurethane hybrid resin molding system which is provided as an A side composition and a B side composition, as described above. The end user of the system reacts the A and B side compositions at the time of molding to obtain the molding compositions, i.e., molded products, according to the invention.

The preferred ratio of active NCO groups to NH groups is between about 5:1 and about 50:1, and most preferably between about 10:1 and about 20:1. The preferred ratio of NCO groups to OH groups is between about 0.8:1 and about 2:1, and the most preferred ratio is between about 0.8:1 and 1.5:1. The preferred stoichiometric index is between about 0.8 and 1.2, while the most preferred is between about 0.9 and 1.1. In a preferred embodiment, at the time of molding, the B side components (i) and (ii) are thoroughly mixed just prior to reacting with the A side, i.e., within about 30 mins. In another preferred embodiment of the invention, the hybrid resin molding compositions comprise about 10-30 weight percent isocyanate, about 35-85 weight percent polyol in monomer solution and about 5-35 weight percent nitrogen-containing compound.

DETAILED DESCRIPTION OF THE INVENTION

The nitrogen-containing compounds of this invention are characterized as being more reactive to isocyanate compounds than those compounds having nitrogen-free reactive groups such as the polyester polyols containing primary hydroxyl, secondary hydroxyl, tertiary hydroxyl, or COOH groups. For convenience, the nitrogen-containing compounds are hereinafter sometimes referred to as "NCC". The difference in reactivity between the NCC end groups and the acid and hydroxyl end groups of the polyol must be great enough that when blended with polyfunctional isocyanates, a two phase polymeric compound is formed in which one phase has primarily urea or biuret links (referred to herein as the "first, soft polyurea phase") and the other phase has primarily urethane and ester links (referred to herein as the "second, more rigid polyester-polyurethane phase").

The first, soft polyurea phase is characterized as having a glass transition temperature lower than the second, more rigid polyester-polyurethane phase. The preferred NCC is one that when reacted with an isocyanate will produce a polyurea phase having a glass transition temperature below 0° C.

The NCC compound is polyfunctional, and its molecular weight must be sufficient to allow separation of the polyurea phase from the polyester polyol when the polyol/NCC solution or mixture is reacted with a polyfunctional isocyanate. The critical molecular weight at which the polyurea will separate from the polyol/polyisocyanate solution is believed to be influenced by the aromatic to aliphatic ratio, functionality and molecular weight of the nitrogen-containing compound. If the NCC compound has two terminal amino groups, the NCC preferably has a molecular weight of between about 1000 and about 4000, while the most preferred NCC has a molecular weight of between about 1500 and about 3000. If the NCC has a functionality greater than two and/or contains aromatic groups within its backbone, a lower molecular weight NCC compound may be sufficient for separation of the polyurea phase. However, a nitrogen-containing compound having too low a molecular weight will not produce the desired two phase molding compositions of the invention wherein the ratio of NCO groups to NH groups is greater than 3:1. Examples of low molecular weight NCC's that do not produce a two phase molding composition according to the invention include 1,2-propylenediamine and 4,9-dioxadodecane-1,12-diamine.

The preferred NCC is liquid at room temperature and soluble in the unsaturated polyester polyol. However, solubility is not a requirement to achieve the desired morphology for shrink control properties. A solid or waxy NCC is acceptable if it can be readily dissolved in an ethylenically unsaturated monomer or a polyhydroxyl compound. Examples of suitable NCC compounds include polyoxyalkylenes having two or more terminal amino groups, such as polyoxypropylenediamine, polytetramethyleneoxide-di-p-aminobenzoate and bis-(3-aminopropyl)-polytetrahydrofuran and mixtures thereof. Other suitable NCC compounds are polyorganosiloxanes having two or more terminal amino groups such as polydimethylsiloxanediamine, and conjugated diene acrylonitrile copolymers having two or more terminal amino groups. The preferred NCC compound is polyoxypropylenediamine which provides a hybrid system having an optimal viscosity.

The NCC can optionally contain aromatic or aliphatic polyfunctional amine chain extenders used commonly in the polyurethane industry. Examples of suitable aromatic amine chain extenders include diethyltoluenediamine, o-,m-,p-phenylenediamine, tertiarybutyltoluenediamine, isomeric toluenediamines, methylene dianiline, polymethylene polyphenylene amines (condensation products of aniline and formaldehyde), 4,4'-diaminodiphenylamine, isomeric diaminoanthraquinones, isomeric diaminonaphthalenes, 2,5-diamino pyridine, 4,4'-methylene bis(2,6-diisopropyl aniline), N,N' dimethyl-1,3-phenylenediamine, N,N' diphenyl-1,4-phenylenediamine, isomers of dimethylthiotoluenediamine and mixtures thereof. Examples of suitable aliphatic amine chain extenders include: 4,9-dioxadodecane-1,12-diamine, 1,2-propylenediamine, dimethyldiaminodicyclohexylmethane, 2-methylpentamethylenediamine, bis-hexamethylenetriamine, 1,2-diaminocyclohexane, hexamethylenediamine, 1,3-diaminopentane, 3-(2-aminoethyl)-aminopropylamine, 3-amino-1-cyclohexylaminopropane, 3-amino-1-methylaminopropane, N-(3-aminopropyl)-cyclohexylamine, bis(3-aminopropyl)-ethylenediamine, N-cyclohexyl-1,13-propanediamine, 4,4'-diaminodicyclohexylmethane, 1,3-diaminopropane, 1,2-diaminopropane, and mixtures thereof.

The ethylenically unsaturated monomer used in the composition of the invention can be any ethylenically unsaturated monomer capable of cross-linking the unsaturated polyester polyol via vinyl addition polymerization. Examples of useful ethylenically unsaturated monomers are styrene, o-, m-, p-methyl styrene, methyl acrylate, methyl methacrylate, t-butylstyrene, divinyl benzene, diallyl phthalate, triallyl cyanurate and mixtures thereof. The preferred monomer is styrene because it provides an economical monomer solution.

The unsaturated polyester polyol has at least one dicarboxylic alkene moiety and is preferably an oligomer of an alpha, beta-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester polyol can also be prepared from unsaturated di- or polycarboxylic acid(s) or anhydride(s) with glycols and/or polyhydric alcohol(s). The polyols used in this invention have an acid number less than five, and preferably less than about two. Further, the polyols used in this invention have equivalent weights of between about 250 and about 1000, and preferably between about 250 and about 500. Examples of suitable saturated di- or polycarboxylic acids include isophthalic, orthophthalic, terephthalic, adipic, succinic, sebacic acid and mixtures thereof, with isophthalic acid being preferred. Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol and mixtures thereof.

The isocyanate compound, typically referred to as a polyisocyanate, must have at least two functional groups and be capable of reacting with the NCC and the polyester polyol. Examples of suitable isocyanate compounds include 2,4- and 2,6-toluene diisocyanate (TDI), 4,4'-diphenylmethylene diisocyanate (MDI), polymethylene polyphenyl isocyanate (PMPPI), dianisidine diisocyanate, metaphenylene diisocyanate, isophrone diisocyanate, hexamethylene diisocyanate and mixtures thereof. The preferred isocyanates are liquified MDI's or PMPPI's.

In the in situ polyurea hybrid reaction there can be used a catalyst capable of catalyzing the polyurethane-forming reaction between the polyisocyanate and the polyhydroxyl compounds, a catalyst capable of catalyzing the polyurea or biuret-forming reaction between the polyisocyanate and the NCC compound, and a free radical polymerization catalyst capable of catalyzing the vinyl polymerization. These catalysts are well-known to those skilled in the art.

The free radical polymerization catalysts useful in producing the molding compositions of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiarybutyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate. Promoters can also be used in combination with vinyl polymerization peroxide catalysts to control the rate of free radical initiation. A common benzoyl peroxide promoter is N,N-diethylaniline.

Catalysts that are useful in catalyzing the polyurethane formation in producing the hybrid polymer in accordance with this invention include: (a) tertiary amines such as N,N-dimethylcyclohexylamine; (b) tertiary phosphines such as trialkylphosphines; (c) strong bases such as alkali and alkaline earth metal hydroxides, alkoxides, and phenoxides; (d) acidic metal salts of strong acids such as ferric chloride; and (e) organotin compounds such as dibutyltin dilaurate. Other commonly used catalysts for making polyurethanes can be found in U.S. Pat. No. 4,280,979, incorporated herein by reference.

While applicant does not wish to be bound by any theory, applicant believes that when the A and B side compositions are mixed at the time of molding, the nitrogen-containing compound is more reactive than the hydroxyl or acid end groups of the polyester polyol toward the isocyanate groups in the A side composition. Because of this difference in reactivity, it is believed that more than one reaction occurs including the in situ formation of a first, soft polyurea phase within a second, more rigid polyester-polyurethane phase, which has a higher glass transition temperature and heat deflection temperature than the first, soft polyurea phase. The polyurea phase is believed to be formed by the reaction of the NCC groups in the B side composition with the isocyanate groups in the A side composition, resulting in the in situ formation of a polymeric polyurea phase that is high enough in molecular weight to separate from the polyester polyol. This phase is characterized as being soft and flexible, imparting improved shrink control and optimally impact strength to the hybrid matrix.

Upon, during and after phase separation of the polyurea phase from the polyester polyol, it is believed that the second, more rigid phase is formed by the reaction of the hydroxyl and acid end groups of the unsaturated polyester polyol with the isocyanate groups not consumed in the NCC/isocyanate reaction, and the ethylenically unsaturated monomer copolymerizes with the unsaturated moieties in the polyester polyol to form a polyester-polyurethane. Cross-linking occurs through vinyl polymerization of the olefinically unsaturated moieties of the polyester polyol and the polymerizable ethylenically unsaturated monomer. It is during this cross-linking that curing occurs. Curing is complete when the reactive sites have been eliminated from the hybrid resin.

The necessity for the stoichiometric excess of NCO to NH is critical in the instant invention to allow the unconsumed NCO groups of the isocyanate to react with the hydroxyl groups of the polyester polyol to form a high molecular weight polyester-polyurethane hybrid. This polyester-polyurethane hybrid produces the second, more rigid phase. Without the NCO/OH reaction, the first, soft polyurea phase would be finely dispersed in a weak polyester phase. The in situ formation of the first, soft polyurea phase in the polyester-polyurethane hybrid results in novel resins that offer a balance of properties not found in previous hybrid systems. These properties include improved shrink control, surface appearance and impact, while maintaining good thermal properties and gel times.

The hybrid resins of the invention can be fabricated using liquid reactive molding or compression molding techniques commonly employed in the unsaturated polyester and polyurethane industries. Liquid molding is the direct injecting or pouring of a hybrid resin into a mold (closed molding) or onto a mold (open molding). In liquid injection closed molding, the polyisocyanate and hydroxy-terminated polyester in the monomer solution (polyol) are fed separately into the chamber of a mixing head where the two components are mixed. Upon mixing, the hybrid reaction begins instantaneously whereby the rate of reactivity is dependent on the catalyst used. The hybrid liquid stream is injected between mold halves wherein the reactions between the various components of the hybrid resin system continue. After sufficient time for cure, the part is removed from the mold. The part can be used as molded or be further post-annealed in an oven. Common liquid closed molding techniques include resin transfer molding (RTM), reaction injection molding (RIM) and structural reaction injection molding (S-RIM).

Liquid injection open molding follows the same procedure except the hybrid resin is sprayed onto a mold where one side of the molded part is exposed to the atmosphere. This molding process is commonly termed "spray-up molding." Direct pour liquid molding comprises hand-mixing the polyol and polyisocyanate and then pouring the hybrid liquid into or onto a mold wherein curing occurs. The main differences between injection and pouring is the mix time, mix intensity and injection pressure. In both liquid molding techniques, the polyol and/or polyisocyanate can contain fibrous materials, fillers and/or other additives.

Hybrid resins are also amenable to compression molding. Common compression molding techniques include sheet, bulk or dough molding identified as SMC, BMC and DMC, respectively. Regardless of the molding technique employed, the hybrid resins of the invention have the advantages of improved shrinkage control, surface appearance and impact strength without significantly sacrificing thermal properties.

The preferred liquid molding system has at least two liquid streams feeding into a mix head where the in situ hybrid cure begins. In a two stream system, the nitrogen-containing compound and polyester polyol are first mixed, then pumped into the mix head where the polyisocyanate is introduced, at which time the resinous hybrid is injected into the mold. The nitrogen-containing compound can be mixed in-line or prior to adding to the polyol feed tank of the liquid molding machine. The former would require an additional feed line. The only mixing requirement is that the nitrogen-containing compound is thoroughly mixed with the polyol before introducing the polyisocyanate. When aliphatic amine-terminated polyamines are used, it is important that the mix times between the polyamine and the polyol, and the amine-modified polyol with the polyisocyanate are short, i.e., less than about 30 mins. This is to minimize the addition of the amine across the alpha, beta unsaturation of the polyester polyol (Michael addition). The minimization of the Michael addition reaction is important to prevent the formation of an undesirable single phase hybrid having urea links within the hybrid backbone.

By adjusting the stoichiometry and/or the use of urethane and polyester catalysts, the gel time of the in situ hybrid can be adjusted from about 30 sec to about 20 mins. The gel time will dictate the time required between mixing the three components and injecting the resinous material into the mold.

Optionally, fibers, fillers, catalysts, pigments, flame retardants, processing aids such as viscosity reducing agents and internal lubricants, all of which are well known to those skilled in the art, can be added to the molding compositions of the invention. Various organic or inorganic fibers or fillers can be added to improve the reinforcing properties of the hybrid and/or reduce its cost. Such organic fibers include polyacrylonitrile fibers (PAN), pitch-based carbon fibers, aromatic polyamide fibers, liquid crystal polyester fibers or any polymeric fiber that improves the properties of the hybrid. Inorganic fibers include glass and whiskers, while inorganic fillers include such materials as talc, calcium carbonate, silica beads, calcium sulfate, aluminum trihydrate, ammonium polyphosphate, etc. While the amounts of filler, glass or other additives will vary depending on the application, in one preferred embodiment, about 0-200 parts filler can be added to about 100 parts of the hybrid system of the invention. Up to about 50 weight percent glass can also be added to the above system. For example, in one embodiment, about 100 parts hybrid system to about 100 parts filler and 20 percent glass is used to form a molding composition according to the invention.

PREPARATION OF POLYESTER POLYOLS

Unsaturated polyester polyols which were used to prepare the hybrid resin molding compositions of the invention were prepared as follows:

Unsaturated polyester polyols were prepared by charging the reactants in Table 1 into a standard four-liter, four-neck reaction kettle equipped with a mechanical stirrer, thermometer, a partial condenser comprising a glass column packed with Raschig rings, a total condenser and receiver. This apparatus was mounted in an electric heating mantle with a temperature control device. For each run the entire reaction was carried out in an inert nitrogen atmosphere in which the nitrogen was passed through a rotameter and into the reaction medium near the mechanical stirrer. The reactants were heated slowly until the mixture could be agitated. The reactants were further heated until an overhead temperature of about 98°-100° C. was maintained. The reaction temperature at which water was liberated was about 150° C. Water was continuously removed from the reaction medium through the condenser system. The resin was heated to about 232° C. and held until the acid number was reduced to two or less, but more preferably, one or less.

Typical water content of the polyester polyols used in the invention is less than 1 percent and preferably less than 0.2 percent and most preferably less than 0.05 percent. The removal of water is important for two reasons. First, the removal of water is necessary to obtain the desirable molecular weight of the polyester polyol. Second, the presence of water in the hybrid resins of the invention will cause undesirable foaming.

Typical molecular weights of the polyester polyols (on a solid basis) useful in the instant invention are between about 500 and about 2000 g/mole, and preferably between about 500 and about 1000 g/mole. If the polyol is difunctional, the equivalent weight of the polyol is half the molecular weight, while polyfunctional polyols would have equivalent weights equal to the molecular weight divided by the OH functionality of the polyol. Hydroquinone was then added to the polyols and the inhibited polyols were cooled to between 150° C. to 205° C. The polyols were then added to styrene monomer inhibited with 1,4-naphthoquinone and p-benzoquinone. The resulting polyols contained about 75 percent non-volatile material (NVM). Typical liquid properties of Polyols 1,2,3 and 4 are reported in Table 2.

TABLE 1

Polyester Polyol Formulations

| | Polyol 1 | Polyol 2 | Polyol 3 | Polyol 4 |
|---|---|---|---|---|
| Reactants | | | | |
| Isophthalic Acid, moles | 1.0 | 1.0 | 1.0 | — |
| Maleic Anhydride, moles | 1.0 | 2.0 | 2.0 | 3.0 |
| Diethylene Glycol, moles | 2.64 | 2.42 | — | — |
| Ethylene Glycol, moles | — | 1.50 | 1.96 | 1.96 |
| Neopentyl Glycol, moles | — | — | 1.96 | 1.96 |
| Di-n-butyl tin maleate, ppm | 250 | 250 | 250 | 250 |
| Inhibitors | | | | |
| Hydroquinone, ppm | 150 | 150 | 150 | 150 |
| 1,4-Naphthoquinone, ppm | 75 | 75 | 75 | 75 |
| p-benzoquinone, ppm | 100 | 100 | 100 | 100 |

TABLE 2

Typical Liquid Resin Properties of Polyols

| | Polyol 1 | Polyol 2 | Polyol 3 | Polyol 4 |
|---|---|---|---|---|
| Degree of unsaturation (mole/kg)* | 2.04 | 3.12 | 3.25 | 5.30 |
| Acid Number, solid basis - mg KOH/g | <2 | <2 | <2 | <2 |
| OH Number, solid basis - mg KOH/g. | 146 | 160 | 167 | 181 |
| Styrene Monomer, wt. % | 25 | 25 | 25 | 25 |
| Equiv. wt. as supplied - g/equivalent OH | 513 | 467 | 450 | 413 |

*The degree of unsaturation is calculated by dividing the weight of the polyester into the moles of maleic anhydride. The data is normalized to 1000 g of polyol.

PREPARATION OF HYBRID RESINS

The general procedure for preparing the A and B sides of a hybrid resin which can be modified according to the invention is described below.

As reported in Table 3, three polyisocyanates sold under the trademarks Isonate 143L, Isonate 240, and Papi 2027, were used to prepare the A sides. These polyisocyanates are manufactured by Dow Chemical and were used as received. Isonate 143L is a polycarbodiimide-modified diphenylmethane diisocyanate having an isocyanate equivalent weight of about 143.6 g/equivalent of NCO, an NCO content by weight of 29.2 percent, a viscosity at 25° C. of 33 cps, a density at 25° C. of 1.214 g/ml and an NCO functionality of about 2.25. Isonate 240 is a modified 4,4'-diphenylmethylene diisocyanate (MDI) prepolymer produced by reacting high-purity diphenylmethane diisocyanate with a saturated polyester. Isonate 240 is characterized as having an isocyanate equivalent weight of about 226.3 g/equivalent of NCO, an NCO content by weight of 18.7 percent, a viscosity at 25° C. of 1500 cps, a density at 25° C. of 1.22 g/ml and an NCO functionality of about 2.05. Papi 2027 is a polymethylene polyphenylisocyanate (PMPPI). Papi 2027 is characterized as having an NCO functionality of 2.7, an isocyanate equivalent weight of 134.0 g/equivalent of NCO, a viscosity at 25° C. of 180 cps, and a density at 25° C. of 1.23 g/ml.

The A side was prepared by mixing one of the above polyisocyanate materials with a paste of benzoyl peroxide (BPO) and styrene. The paste was first prepared by mixing 1.0 php of Lucidol 98 BPO manufactured by Atochem with an equal weight of styrene. The addition of the BPO catalyst is based on parts per hundred of unsaturated polyol plus styrene (php). The BPO paste and isocyanate were hand mixed in a paper cup using a wood tongue depressor and allowed to deaerate for 10 mins.

The B side was prepared using Polyols 1, 3 and 4 described above. Polyol 1 had a hydroxyl equivalent weight of 660 g/equivalent of OH at a nonvolatile polyol solid content (NVM) of 72.6 percent of the polyol and styrene system, while Polyol 3 had a hydroxyl equivalent weight of 499 g/equivalent of OH at an NVM of 74.2 percent. Polyol 4 had a hydroxyl equivalent weight of 493 g/equivalent of OH and an NVM of 74.9 percent. To each polyol was added enough styrene monomer to reduce the NVM to 65 percent of the total solution weight. The NVM was corrected to account for the styrene that was added to the A side. N,N-diethylaniline (DEA) was mixed into the polyol at a 0.2 php level to promote the polyester reaction. After mixing the B side, the sample was allowed to deaerate for 10 mins.

The two components of the hybrid resin, the A and B sides, were then mixed by adding a stoichiometric amount of A side to B side in a paper cup. The stoichiometric amount is obtained by adding an equal mole equivalent of the polyisocyanate to an equal mole equivalent of polyol such that the ratio of NCO:OH is 1. For example, to prepare a 75 g hybrid sample having a stoichiometric amount of A and B sides, 51.97 g of Polyol 3 is blended with 14.96 g of Isonate 143L. The remaining 8.07 g is made up of styrene monomer (7.36 g), DEA (0.12 g) and BPO (0.59 g). The resin was hand mixed with a tongue depressor for 15 sec, and a Type J thermocouple connected to a Doric temperature monitor was inserted into the center of the sample. Taking the time of addition of the A side to the B side as T=0, temperature vs. time profiles were recorded. The time to cessation of flow was determined to be the gel time. Gel time was determined by repeatedly dipping a rod into the sample until the material strung and snapped from the rod.

A total of nine hybrid samples were prepared, each containing a different polyol (Polyol 1, 3, or 4) and polyisocyanate (Isonate 143L, Isonate 240, Papi 2027). The resulting systems were formulated to have a balanced stoichiometry such that the isocyanate index was 100 (NCO:OH active primary hydrogen). After 30 sec of mixing the A and B sides, the temperature of the reaction medium increased less than 0.3° C. and the reaction solutions were clear. A drop of each hybrid was placed between a glass slide and a microscope glass cover and observed using a Nikon 260248 Optiphot transmission microscope at 200× and 400×. Each hybrid system was homogeneous exhibiting a single phase morphology. Each hybrid system was formulated to have a gel time of about 20 mins. This allowed adequate time for the sample to deaerate before solidification occurred.

To measure the linear shrinkage of the above hybrid resins, cast panels were prepared by pouring about 300 g of each hybrid resin into a 7 in×7 in steel mold designed with removable sides to allow easy ejection of zero shrink material. Prior to pouring the hybrid resin into the mold, the mold surface was generously coated with a mold release agent. Numerous commercial silicone or dry TFE Teflon lubricant sprays can be used to minimize sticking during cure. Miller-Stephenson MS-122 TFE dry lubricant spray is an example of a suitable mold release agent. The casting was prepared at room temperature under atmospheric pressure. After solidifying, the part was de-molded and the as-cast room temperature shrinkage was measured after 24 hrs of aging. The part was then post-cured for 2 hrs at 105° C., and the total shrinkage (as-cast plus heat cured) was determined at room temperature. The part was reheated for 2 hrs at 175° C. and then remeasured for shrinkage. Shrinkage was measured at the four corners, and the mean and standard deviations were calculated. The lower the standard deviation, the more uniform the shrinkage is in the X and Y directions.

The shrinkage of the unsaturated polyester component of the hybrid resin was determined by removing the isocyanate from the mixture (i.e., A side). A total of nine hybrid resins and three polyesters were evaluated. The results are shown in Table 3. Note that each hybrid resin (i.e., Polyols 1, 3 and 4), regardless of the polyisocyanate used, had a lower shrinkage after cure than its corresponding polyol/styrene (unsaturated polyester) counterpart. Furthermore, each sample had a low standard deviation. This indicates uniform shrinkage in the X and Y directions.

The hybrid resins described above are homogeneous and in a single phase. These hybrid resins have shrink benefits when compared to their polyester counterparts and are described herein both to show the starting materials for the NCC-modified hybrid resins of the invention and to compare the shrinkage of conventional hybrid resins vs. the NCC-modified resins of the invention.

TABLE 3

Shrinkage Profile of Polyisocyanate-Based Hybrid Resins

| | | Shrinkage Measured at Room Temperature | | |
|---|---|---|---|---|
| | | | Total After Cure | |
| Polyol | Isocyanate | As-Cast | 105° C./2 Hrs. | 105° C./2 Hrs. plus 175° C./2 Hrs. |
| 1 | — | 21.5 | 22.1 | 24.3 |
| 1 | Isonate 240 | 14.3 | 14.7 | 16.3 |
| 1 | Isonate 143L | 17.4 | 17.3 | 18.0 |
| 1 | Papi 2027 | 16.1 | 16.5 | 16.8 |
| 3 | — | 22.3 | 23.0 | — |
| 3 | Isonate 240 | 5.0 | 7.1 | 8.4 |
| 3 | Isonate 143L | 9.0 | 12.7 | 11.1 |
| 3 | Papi 2027 | 7.7 | 9.1 | 9.5 |
| 4 | — | 26.9 | 27.6 | Cracked upon Annealing |
| 4 | Isonate 240 | 15.6 | 15.4 | 15.5 |
| 4 | Isonate 143L | 20.3 | 19.9 | 19.7 |
| 4 | Papi 2027 | 18.9 | 18.2 | 18.0 |

The invention described herein is illustrated, but not limited, by the following examples.

EXAMPLES

Example 1

Hybrid Resins Prepared with Amine-Modified Polyols

Nine polyamine-modified hybrid resins having two phases, a continuous polyester-polyurethane phase and a dispersed polyurea phase, were prepared following the procedure described above for preparation of hybrid resins, except polyoxypropylenediamine (Jeffamine D2000, Texaco) having a number average molecular weight of about 2,000 g/mole and an amine equivalent weight of about 1,000 was added to the B side polyol such that the equivalent ratio of OH:NH was 90:10. Polyoxypropylenediamine is an amine-terminated saturated polyether. The amine groups are located on secondary carbon atoms at the end of the aliphatic polyether chain. The polyamine has about 33 repeat units of an oxypropylene and is characterized as having 1.0 meq/g of total amine of which about 97 percent of the amine is in the primary position. The polyamine has a Brookfield viscosity of 247 cps at 25° C. and a specific gravity of 0.9964 g/ml.

When polyoxypropylenediamine was blended with Polyols 3 and 4, a reddish, clear solution was obtained, an indication that the polyamine is soluble in the polyol (i.e., single phase). When polyoxypropylenediamine was blended with Polyol 1, a cloudy mixture was obtained indicating that the polyamine is not completely soluble in the polyol. After 10 mins of deaeration, each polyamine-modified polyol was blended with a stoichiometric amount of polyisocyanate (Isonate 143L, Isonate 240 or Papi 2027). Stoichiometry was determined by balancing the NCO groups of the polyisocyanate with the primary hydroxyl and primary amine groups of the polyamine-modified polyol resulting in a stoichiometric index of 100. A stoichiometric index of 100 is achieved when 1 mole equivalent of NCO is added to 1 mole equivalent of the sum of NH and OH. The ratio of active NCO groups to primary amine groups was about 10:1. For example, a 75 g sample of a polyamine-modified hybrid was prepared by first adding 10.2 g of Jeffamine D2000 with 43.24 g of Polyol 3 having an equivalent weight of 471 at an NVM of 74.5 percent. An additional 5.82 g of styrene monomer was added along with 0.10 g of DEA. The materials were thoroughly mixed to form the B side. The A side was prepared by mixing 14.65 g of Isonate 143L with a BPO paste containing 0.50 g BPO and 0.50 g styrene. The A and B sides were allowed to deaerate for 10 mins and then mixed together. The temperature increased 8.8° C. after 30 sec. of mixing, and the solution turned opaque. The temperature rise is due to the exothermic reaction of isocyanate with amine to form a urea. The gel time of the hybrid resin was reduced by about 5 mins over the non-modified hybrid resins. A similar exothermic profile and gel time reduction were seen when Polyol 3 was replaced with Polyols 1 and 4.

A drop of the polyamine-modified hybrid system was placed between a microscope slide and a glass cover and evaluated using a transmission microscope at 200× and 400×. A two phase morphology was observed for each hybrid system containing polyoxypropylenediamine.

A total of nine polyamine-modified hybrid systems were evaluated and shrinkage results are reported in Table 4. In all cases, the polyoxypropylenediamine-containing hybrid had lower shrinkages and improved surface appearances over its corresponding hybrid counterpart (Table 3). Based on as-cast shrinkage, the percent reduction in shrinkage was as much as 78 percent. After curing for 2 hrs. at 105° C. and 175° C., the percent reduction in shrinkage was as much as 58 percent. The Shore D hardness of the molded and annealed parts prepared from the polyoxypropylenediamine-modified hybrid resins were similar to the hardness of parts prepared without the polyoxypropylenediamine. This indicates that the polyoxypropylenediamine-modified hybrid cures into a solid, ready-to-use part.

The weight percent polyoxypropylenediamine used in the nine hybrid resins varied from about 10 to about 13.7 percent, depending on the isocyanate and polyol equivalent weights. The shrink control, improved surface appearance and faster gel times are benefits associated with this invention. It is believed that the two phase hybrid morphology is due to the difference in rate of formation of the polyurea and polyurethane containing moieties within the hybrid reaction medium. The difference in the rate of formation between the polyurea and polyurethane results in the in situ formation of polyurea containing domains within the hybrid matrix.

TABLE 4

Shrinkage Profile of Polyamine-Modified Hybrid Resins

| | | Shrinkage | | |
|---|---|---|---|---|
| | | | Total After Cure | |
| Polyol | Isocyanate | As-Cast | 105° C./2 Hrs. | 105° C./2 Hrs. plus 175° C./2 Hrs. |
| 1 | Isonate 240 | 11.3 | 12.3 | 13.8 |
| 1 | Isonate 143L | 13.2 | 13.4 | 14.1 |
| 1 | Papi 2027 | 11.7 | 12.0 | 12.9 |
| 3 | Isonate 240 | 1.1 | 5.3 | 6.5 |
| 3 | Isonate 143L | 2.1 | 6.2 | 7.6 |
| 3 | Papi 2027 | 6.1 | 7.2 | 7.3 |
| 4 | Isonate 240 | 5.2 | 7.1 | 8.0 |
| 4 | Isonate 143L | 7.0 | 8.0 | 8.7 |
| 4 | Papi 2027 | 5.8 | 7.3 | 7.5 |

EXAMPLE 2

Effect of Polyamine Concentration on Shrinkage

Following the procedure described above, as-cast and annealed shrinkages were measured from a hybrid resin containing Polyol 3 and Isonate 143L. Polyol 3 had a hydroxyl equivalent weight of 471 g/equivalent of OH at an NVM of 74.5 percent. Polyamine-modified hybrid resins were prepared following the Example 1 procedure except that 1, 3, 5, 10 and 15 equivalents of polyoxypropylenediamine of Example 1 were added to the polyol resulting in the equivalent OH:NH ratios of: 99:1, 97:3, 95:5, 90:10 and 85:15. These samples are labelled 5C–5G in Table 5. In each sample, the polyol/polyamine blend was clear. Samples 5A and 5B were control samples of an unsaturated polyester from Polyol 3 and a hybrid containing Polyol 3/Isonate 143L, respectively. These samples were also clear.

After allowing the polyamine-modified polyol to deaerate for 10 mins, a stoichiometric amount of Isonate 143L containing 1 php of benzoyl peroxide (BPO) dissolved in an equal amount of styrene monomer was added. Stoichiometry was determined based on balancing the NCO groups of the polyisocyanate with the primary OH and NH groups of the amine-modified polyol (stoichiometric index of 100). Samples 5D, 5E, 5F, and 5G turned a cloudy light brown, while samples 5B and 5C stayed clear when mixed with the polyisocyanate. The cloudy samples exhibited a two phase morphology while the clear samples had a single phase morphology when examined microscopically at 200×. The exotherm of the hybrid reaction was monitored as described above, and the temperature rise after 30 sec of mixing the A and B sides increased with increasing polyoxypropylenediamine concentration. For example, Sample 5C had only a 0.2° C. temperature gain while sample 5F had a 7.4° C. temperature gain.

Table 5 presents the reduction in linear shrinkage of the modified hybrids as the concentration of polyoxypropylenediamine increases. Table 5 also includes the shrinkage of a polyester containing no polyisocyanate or polyoxypropylenediamine (5A), and a hybrid resin containing no polyoxypropylenediamine (5B). The non-modified hybrid resin (5B) has about 45 percent less shrinkage than the polyester control containing no Isonate 143L (5A). The hybrid containing 15 equivalents of polyoxypropylenediamine (5G) has 59 percent less shrinkage than the hybrid control (5B) and 77 percent less shrinkage than the polyester control (5A) after post-curing. The Shore D hardness of the samples ranged from 75-85 after 24 hrs of room temperature cure. This reveals that the polyamine-modified hybrids cure readily at room temperature.

TABLE 5

| Effect of Polyamine Concentration on Shrinkage Profile | | | | |
|---|---|---|---|---|
| | | | Shrinkage | |
| | Polyol 3 (Eq.) | Isonate 143L (Eq.) | Polyoxypropylene-diamine (Eq.) | As-Cast | After Cure 105° C./2 Hrs. |
| Controls | | | | | |
| 5A | 100 | 0 | 0 | 22.3 | 23 |
| 5B | 100 | 100 | 0 | 8.9 | 12.7 |
| Polyamine-Modified | | | | | |
| 5C | 99 | 100 | 1 | 8.7 | 10.2 |
| 5D | 97 | 100 | 3 | 4.2 | 6.9 |
| 5E | 95 | 100 | 5 | 3.1 | 9.1 |
| 5F | 90 | 100 | 10 | 2.1 | 6.2 |
| 5G | 85 | 100 | 15 | 0.9 | 5.2 |

EXAMPLE 3

Toughness Improvement of the Polyamine-Modified Hybrid

Samples 5A, 5B, 5E, 5F, 5G of Example 2 (Table 5) were cut into four 3.375 inch square pieces and milled to 250 mils to eliminate any surface defects introduced during the casting process. An I.C.I. Instrumented Dart Impact Tester was used to determine the impact resistance of the plaque. The test apparatus uses a pneumatically driven plunger with a built-in quartz load cell to impact against the stationary 250 mil thick plaque. Each plaque was impacted at its center, using a 1 in diameter support ring and a 0.5 in diameter plunger, and the results were averaged. The force versus displacement data were continuously monitored by a microcomputer, and several stress, strain and energy related parameters were collected. The peak energy (area under stress-/strain curve) was used to quantify the toughness of the samples. The peak energy for Samples 5A, 5B, 5E, 5F, and 5G was 0.59 ft-lbs, 1.59 ft-lbs, 2.55 ft-lbs, 2.88 ft-lbs, and 6.57 ft-lbs, respectively. The toughness of one of the two-phase polyamine-modified hybrid resins (5G) was four times greater than the hybrid control (5B) and 11 times greater than the polyester control (5A). Example 2 and this Example illustrate that the two phase hybrid resins of the invention containing an in situ developed polyurea phase have improved shrink control and toughness properties when compared to conventional single phase hybrid resins or polyesters.

EXAMPLE 4

Shrink Control Properties of Polydimethylsiloxanediamine: An Insoluble Polyol Blend Following the Example 1 procedure, an insoluble polyamine-modified polyol was prepared by mixing 90 equivalents of Polyol 3 having an equivalent weight of 471 at an NVM of 74.5 percent with 10 equivalents of polydimethylsiloxanediamine. The polyol contained 0.2 php of DEA and had an NVM of 65 percent. The polydimethylsiloxanediamine, which is manufactured by Mercor, Inc., has a molecular weight of about 1,245 g/mole. The saturated polydimethylsiloxanediamine was aminopropyl-terminated having primary amine end groups, and is a clear liquid at room temperature.

When the polydimethylsiloxanediamine was blended with the polyol, a milky white mixture was formed, indicating insolubility. After 10 mins of deaeration, the polyamine-modified polyol was mixed with a stoichiometric amount of Isonate 143L. The sample had an NCO:NH ratio of 10:1 and an NCO:OH ratio of 1.1:1.0. Shrinkage was measured as described above. A control sample containing no polydimethylsiloxanediamine was also prepared. The polyamine-modified hybrid was opaque and had an as-cast shrinkage of 3.0 mils/in with a standard deviation of 0.2, while the hybrid control sample was clear having a shrinkage of 10.5 mils/in with a standard deviation of 0.5 mils/in. After curing for 2 hrs at 105° C., the polyamine-containing hybrid had a shrinkage of 4.8 mils/in, while the control shrinkage was 11.4 mils/in. A drop of each of the polyamine-modified and unmodified hybrids was placed between microscope slides and glass covers and evaluated using a Nikon 260248 Optiphot Transmission Microscope at 200×. The hybrid control (unmodified) exhibited a homogeneous single phase morphology while the polyamine-modified hybrid had finely dispersed polymeric particles in the hybrid matrix.

This example illustrates that the polyamine does not have to be soluble in the polyol to exhibit shrink control properties.

EXAMPLE 5

Glass Transition Temperature of Polyurea from Polyoxypropylenediamine

To determine the glass transition temperature (Tg) of the polyurea phase of polyoxypropylenediamine-modified hybrids, an excess of Isonate 143L, Isonate 240 and Papi 2027 was reacted with polyoxypropylenediamine (Jeffamine D2000) and the polymer was thermally analyzed by Differential Scanning Calorimetry (DSC). The samples were prepared by mixing an excess of polyisocyanate with the polyamine, then collecting, washing and drying the precipitate. Polycondensation occurred immediately on mixing the polyamine with the polyisocyanate. The polyurea was washed in water and rinsed in acetone, then dried in a vacuum oven for 24 hrs at 90° C. before running the DSC. The samples were analyzed under nitrogen at a heat-up rate of 20° C./min, cooled at 10° C./min and then reheated at 20° C./min. The initial heat and heat-after-quench Tg's of the polyureas are reported in Table 6. All of the polyureas appear to have two Tg's, 1 Tg segment of about 15°–30° C. and another Tg segment of about −55° C. The former segment is believed to be associated with the urea link, while the latter segment is believed to be associated with the aliphatic ether group in the polyurea backbone.

The lower Tg of the first, soft polyurea phase in the polyamine-modified hybrids of the invention is believed to be important in imparting toughness in the hybrid matrix. The typical Tg of a conventional non-modified hybrid resin varies from about 40° C. to about 140° C. The second, more rigid polyesterpolyurethane phase of the modified hybrids of the invention will have a Tg of about the same value as conventional hybrids, which is much higher than the first, soft polyurea phase.

TABLE 6

| | Glass Transition Temperature of Polyureas | | |
|---|---|---|---|
| Sample | 6A | 6B | 6C |
| Isonate 143L | | x | |
| Isonate 240 | x | | |
| Papi 2027 | | | x |
| Jeffamine D2000 | x | x | x |
| Tg °C. | | | |
| Initial Heat | Not detected | −53.1/16.8 | −53.2 |
| Heat-after-quench | −55.2/31.4 | −52.8/19.3 | −54.0/23.7 |

EXAMPLE 6

Effect of Gel Time on Polyamine-Modified Hybrid Morphology

Polyol 3 of Example 4 was blended with styrene monomer until a 65 percent NVM was achieved. To the polyol was added one or more of the following catalysts/promoters: N,N'-diethylaniline (DEA), N,N'-dimethyl p-toluidine (DMPT), dibutyltin dilaurate (DABCO T-12, Air Products, Inc.), and N,N-dimethylcyclohexylamine (Polycat 9, Air Products, Inc.) at the php levels shown in Table 7. The polyol was then equilibrated to 23° C. before blending with polyoxypropylenediamine (Jeffamine D2000) at the same temperature such that the equivalent weight ratio was 90:10 (OH:NH). The polyamine polyol was then allowed to deaerate for 10 mins before blending with a stoichiometric amount of the polyisocyanate which was equilibrated at 23° C.

Gel time was determined by repeatedly dipping a rod into a cup containing about 75 g of the polyamine-modified hybrid until the mixture strung and snapped from the rod. Table 7 illustrates that the gel time of the polyamine-modified hybrid can be adjusted from about 900 sec to 20 sec. A drop of each polyamine-modified hybrid was placed between a microscope slide and a thin glass cover. In each case, a two phase morphology was observed. It was also observed that gel time and polyurea domain sizes are directly related for this system, in that it appears that as gel time decreases, domain size decreases.

TABLE 7

| | 7A | 7B | 7C | 7D |
|---|---|---|---|---|
| A Side Formulation | | | | |
| Isonate 143L | 100 eq. | 100 eq. | 100 eq. | 100 eq. |
| BPO - Lucidol 98 | 1.0 php | 1.0 php | 1.0 php | 1.5 php |
| Styrene | 1.0 php | 1.0 php | 1.0 php | 1.5 php |
| B Side Formulation | | | | |
| Polyol 3 | 90 eq. | 90 eq. | 90 eq. | 90 eq. |
| Jeffamine D2000 | 10 eq. | 10 eq. | 10 eq. | 10 eq. |
| DEA | 0.2 php | 0.2 php | 0.2 php | — |
| DMPT | — | — | — | 0.5 php |
| DABCO T-12 | — | 0.3 php | 0.5 php | 0.5 php |
| Polycat 9 | — | — | — | 0.3 php |
| Styrene (NVM) | 65% | 65% | 65% | 65% |
| Gel Time (seconds) | 900 | 90 | 45 | 20 |

Note: NVM is based on the unsaturated polyol weight; php is based on the unsaturated polyol weight plus styrene weight.

As illustrated in this example, gel time affects domain size and can be adjusted depending on the selected catalyst. This may be important when designing fast cure systems. If at fast gel times the domain size becomes too small to achieve desirable shrink control properties, the addition of isocyanates or amines of higher functionalities may be preferred.

EXAMPLE 7

Effect of Polyamine Functionality and Molecular Weight on Hybrid Morphology

Polyol 3 having a hydroxyl equivalent weight of 480 at an NVM of 76 percent was blended with sytrene monomer until the NVM of the polyol was 65 percent. To the polyol was added 0.2 php of DEA. Four polyamines were added to the polyol. See Table 8 for the weight ratio of polyamine to polyol. Each polyamine-modified polyol was prepared so that about 13 weight percent of the hybrid was polyamine as illustrated in Table 8. The polyamines were polyethers having different molecular weights and amine functionalities.

The polyether amines included three difunctional polyethers having molecular weights of 400 g/mole (Jeffamine D400), 2,000 g/mole (Jeffamine D2000), and 4,000 g/mole (Jeffamine D4000). These polyether amines are manufactured and sold by Texaco Chemical. Jeffamine D400 and D4000 are amine-terminated polypropylene glycols having a similar structure to Jeffamine D2000. Jeffamine D400 has 4.4 meq/g of total amine of which about 97 percent are in the primary position. Jeffamine D4000 has 0.45 meq/g of total amine of which about 97 percent are in the primary position. The fourth polyamine was Jeffamine T-3000 which is a primary polyether triamine of approximately 3,000 molecular weight. It has 0.94 meq/g of total amine of which 99 percent are in the primary position.

The polyamine-modified polyols were reddish-clear in appearance except for the Jeffamine D4000 polyol which was light brown and opaque. After allowing the polyamine-modified polyol to deaerate for 10 mins, it was reacted with a stoichiometric amount of polyisocyanate [NCO:(OH+NH)=1] containing a BPO/styrene paste as described in "Preparation of Hybrid Resins." The hybrid was then cast, and the shrinkage was measured. The results are reported in Table 8.

When the tri-functional polyamine-modified polyol was mixed with the polyisocyanate, an immediate viscosity build-up occurred resulting in a system too viscous to cast. Although to a lesser extent, a similar observation was made for the Jeffamine D400 polyol making it difficult to cast a shrinkage panel. At a comparable weight, Jeffamine D400 has a higher concentration of amine end groups than Jeffamine D2000 or D4000. This makes the Jeffamine D400 much more reactive than its higher molecular weight counterparts in the hybrid system.

Following the procedure of Example 1, a two phase morphology was observed for each of the polyamine-modified hybrids. The Jeffamine D2000 and D4000 hybrids appear to have a dispersed spherical phase, while the Jeffamine D400 and T3000 appear to have co-continuous or large irregularly shaped domains. Although shrinkage of the systems was not determined for all samples, the effect of amine functionality on hybrid morphology, i.e., two phase morphology, was demonstrated.

TABLE 8

|  | 8A | 8B | 8C | 8D | 8E |
|---|---|---|---|---|---|
| B Side Formulation (Grams) |  |  |  |  |  |
| Polyol 3 | 156.2 | 171.71 | 173.67 | 171.71 | 204.81 |
| Jeffamine D400 | 39.9 | — | — | — | — |
| Jeffamine D2000 | — | 39.75 | — | — | — |
| Jeffamine D4000 | — | — | 39.69 | — | — |
| Jeffamine T3000 | — | — | — | 39.75 | — |
| N,N'Diethylaniline | 0.37 | 0.4 | 0.41 | 0.4 | 0.47 |
| Styrene | 24.6 | 27.05 | 27.36 | 27.05 | 27.59 |
| NCO:NH | 2.6 | 10.0 | 19.2 | 10.0 | — |
| NCO:OH | 1.6 | 1.11 | 1.05 | 1.11 | 1.0 |
| NCO:(OH + NH) | 1.0 | 1.0 | 1.0 | 1.0 | 1.0 |
| A Side Formulation (Grams) |  |  |  |  |  |
| Isonate 143L | 75.35 | 57.08 | 54.81 | 57.08 | 62.44 |
| Benzoyl peroxide | 1.83 | 2.01 | 2.03 | 2.01 | 2.35 |
| Styrene | 1.83 | 2.01 | 2.03 | 2.01 | 2.35 |
| Weight % Polyamine in Hybrid | 13.2% | 13.2% | 13.2% | 13.2% | 0.0% |
| Linear Shrinkage as-cast (mils/in) | 2.0 | 1.6 | 4.9 | NR | 8.5 |

This Example demonstrates the importance of polyamine functionality on the morphology of the in situ polyurea-modified hybrid. Furthermore, this example demonstrates the ease of tailoring the morphology of the in situ hybrid. By altering the gel time and functionalities, it is possible to achieve an in situ polyurea phase that is either finely dispersed or co-continuous in the hybrid phase.

EXAMPLE 8

Physical Properties of an In Situ System that Offers Shrink Control Benefits

Physical and thermal properties of Polyol 3/Isonate 143L-based hybrids were measured with and without various amounts of polyoxypropylenediamine (Jeffamine D2000). The properties and the components used to make the hybrids are reported in Table 9.

The A side of the hybrid was first prepared by mixing the benzoyl peroxide (Lucidol 98) in Table 9 with an equal amount of styrene monomer. To the paste was added Isonate 143L.

The B side of the hybrid was prepared by adding to Polyol 3, having an equivalent weight of 499 at an NVM of 74.2 percent, the remaining styrene in Table 9 and N,N'-diethylaniline (DEA). To the polyol/styrene solution were blended various amounts of polyoxypropylenediamine of Example 1, resulting in polyamine concentrations ranging from 0 to about 13 percent based on total hybrid weight. After mixing the polyamine with the polyol, the clear solution was allowed to deaerate for 10 mins before mixing with a stoichiometric amount of polyisocyanate NCO:(OH+NH)=1. A total of 450 g of the polyamine-modified hybrid was prepared.

On mixing, the polyamine-modified hybrid turned milky light brown and opaque. The control hybrid with no polyamine stayed clear on mixing. Following the Example 1 procedure, a drop of each hybrid system was placed on a microscope slide and evaluated at 200×. A two phase morphology was observed for each polyamine-modified hybrid system, while a single phase was observed for the hybrid control.

The hybrid solution (approximately 450 g) was poured between two glass plates having a 125 mil rubber spacer. To prevent leakage around the spacer, alligator clamps were used to hold the glass panels together. The glass plates were coated with a mold release agent for ease of part removal. The hybrid resin was cured at about 23° C. for about 16 hrs and then post-cured for 2 hrs at 105° C. The hybrid sample was clear, tack-free and rigid. Similar tack-free parts were prepared from the polyamine-modified hybrid systems. The polyamine-modified hybrid castings were light brown and opaque. After annealing, samples were routed and tested following ASTM procedures for tensile properties (ASTM D638), flexural properties (ASTM D790), heat deflection temperature (HDT) (ASTM D648), and no-notched Izod impact (ASTM D256).

The glass transition temperature (Tg) of the annealed parts was determined using a Differential Scanning Calorimeter (DSC) and a Dynamic Mechanical Analyzer (DMA). The DSC samples were heated from about 0° C. to about 250° C. at 20° C./min and then quenched to about room temperature and then reheated at about 20° C. The Tg's of the polyamine-modified hybrids were all about 85° C.±3° C., while the hybrid control (Sample 9A) had a Tg of about 105° C. The Tg of the first heat cycle is also reported in Table 9. DMA samples were run at a fixed frequency of 1 Hz from −150° C. to 250° C. at a heating rate of 5° C./min. Tg's were determined by onset extrapolation of the step change in the flexural storage modulus (E') and by the peak maximum from the flexural loss modulus (E"). The Tg's determined by E" were about 100 to about 105° C. for the polyamine-modified hybrids, while the Tg of the hybrid control was 104° C. A second Tg at about −15° C. was observed with the polyamine-modified hybrid containing about 13 weight percent polyoxypropylenediamine (Sample 9E). All samples had a second transition at about −60° to −80° C. which may be a beta transition. The beta transition may hide the Tg of the polyurea-containing phase. The HDT's of the polyamine samples were also similar to the control hybrid as illustrated in Table 9.

Table 9 also presents the physical properties of the polyamine-modified hybrids and the hybrid control. Increasing the weight percent of polyoxypropylenediamine improves the toughness of the hybrid system as illustrated by tensile elongation, tensile energy, and no-notched Izod impact. For example, break tensile elongation increased from about 2.4 percent to 11.1 percent, while the no-notched Izod impact increased from about 6.1 to 13.6 ft-lbs. Furthermore, the area under the tensile stress/strain curve significantly increased from about 2.3 to about 8.7 ft-lbs. The tensile area is a good method of quantifying the toughness of a polymer under slow deformation rates. Although a significant increase in toughness occurred when the hybrid was modified with the polyamine, the thermal properties were only modestly reduced giving this hybrid a novel balance of toughness and thermal properties.

A piece of casting (9E) was cast in epoxy, polished and observed under a microscope at 200×. Finely dispersed domains were observed having particles ranging from sub-micron to about 10μ. For improved impact particularly, it is preferable that the molding compositions of the invention have a soft polyurea dispersed phase having a particle size of less than 25μ and most preferably less than 10μ. The control hybrid sample (9A) was homogeneous with no sign of a second phase.

TABLE 9

Properties of Polyamine-Modified Hybrid Resins Containing a Polyoxypropyleneamine-Modified Polyol 3

|  | 9A | 9B | 9C | 9D | 9E |
|---|---|---|---|---|---|
| FORMULATIONS (Grams) | | | | | |
| Polyol 3 | 311.85 | 290.62 | 277.37 | 264.78 | 264.43 |
| Isonate 143L | 89.73 | 86.22 | 84.02 | 81.93 | 84.55 |
| Jeffamine D2000 | 0.0 | 18.01 | 29.26 | 39.94 | 58.88 |
| BPO | 3.56 | 3.59 | 3.62 | 3.64 | 3.92 |
| DEA | 0.72 | 0.72 | 0.72 | 0.73 | 0.78 |
| Styrene | 42.15 | 50.83 | 55.02 | 58.99 | 37.423 |
| Percent Polyamine in Hybrid | 0.0% | 4.0% | 6.5% | 8.9% | 13.1% |
| PHYSICAL PROPERTIES | | | | | |
| Tensile Strength (PSI) | | | | | |
| Break | 9,417 | 10,186 | 8,697 | 7,695 | 6,400 |
| Yield | None | None | None | 7,721 | 6,286 |
| Tensile Elongation (%) | | | | | |
| Break | 2.37 | 3.49 | 4.27 | 8.50 | 11.10 |
| Yield | None | None | None | 5.7 | 5.2 |
| Tensile Energy (Ft-Lbs) | 2.3 | 4.0 | 3.8 | 8.3 | 8.7 |
| Flexural Strength (PSI) | 20,483 | 19,445 | 16,663 | 14,504 | 12,545 |
| Flexural Modulus (PSI) | 561,616 | 486,514 | 429,454 | 370,847 | 302,723 |
| Secant Modulus (PSI) | 562,012 | 486,787 | 429,547 | 370,152 | 302,259 |
| No-Notched Izod (Ft-Lbs/In) | 6.14 | 5.28 | 8.58 | 8.84 | 13.56 |
| Thermal Properties (°C.) | | | | | |
| HDT @ 264 PSI (°C.) | 96.0 | 93.0 | 96.0 | 97.0 | 84.0 |
| Tg °C. | | | | | |
| DSC - Initial Heat | 101.0 | 81.4 | 62.0 | 87.2 | 77.5 |
| DSC - After Quench | 105.0 | 83.6 | 86.0 | 86.0 | 84.8 |
| DMA - E' | 76.1 | 68.4 | 83.0 | 80.4 | −25/74.5 |
| DMA - E" | 103.6 | 101.1 | 104.2 | 101.8 | −14/100 |
| Beta Transition (°C.) | −61.4 | −74.1 | −78.2 | −72.2 | −67.2 |

EXAMPLE 9

Hybrid Shrink Control Properties with a Polyurea Containing Polyol

Polyol 3 having a hydroxyl equivalent weight of 508 at an NVM of 74.4 percent, was diluted with styrene monomer until a 65 percent NVM was achieved. To the polyol was added 0.2 php of DEA. The polyol was then blended with a urea-terminated polyether (Jeffamine BuD-2000 sold by Texaco Chemical). Jeffamine BuD-2000 polyether is a liquid at room temperature and is similar to Jeffamine D2000 of Example 1, except that the end groups are urea instead of amine. Jeffamine BuD-2000 is prepared by reacting Jeffamine D2000 with two moles of urea. It is characterized as having 2.6 percent nitrogen and a viscosity at 23° C. of about 22,000 cp. Its molecular weight is about 2,000 g/mole, and its urea equivalent weight is about 1,000.

Two polyurea-modified polyols were prepared having an equivalent ratio of OH:urea groups of 95:5 (10A) and 90:10 (10B). The polyurea-modified polyols were white and opaque indicating the polyol and the polyurea are not soluble. After allowing the polyurea polyols to deaerate for 10 mins, they were blended with a stoichiometric amount of Isonate 143L which contained 1.0 php of BPO dissolved in an equal amount of styrene monomer. The stoichiometry was based on the urea and primary hydroxyl end groups. The formulation is set forth in Table 10. The shrinkages of the opaque castings after curing for 24 hrs at room temperature were 1.8 (10A) and 2.0 (10B) mils/inch while their Shore D hardness values were 79 and 78, respectively. After post-curing at 105° C. for 2 hrs, the shrinkage/hardness values were 5.8/83 and 4.9/79 mils/inch, respectively. The control hybrid (10C), having no polyurea added to the polyol, had a shrinkage after 24 hrs of room temperature curing of 11.7 mils/in. The control casting was clear. The shrinkage did not change after post-curing at 105° C. for 2 hrs.

A drop of each of the polyurea-modified polyol hybrids was observed under a microscope, and a two phase morphology was observed. The Tg's of the samples were determined using DMA as described in Example 8. Two Tg's were observed with the polyurea-modified hybrid, a first Tg at approximately −50° C. which corresponds to the dispersed polyurea phase and a second Tg of about 90° C. which corresponds to the polyester-polyurethane hybrid phase. The control sample had a single Tg of about 88° C. The gel times of Samples 10A and 10B were about 6 and 8 mins, respectively, while the control gel time was 24 mins. The temperature rise after the first two mins of mixing the polyurea-modified polyol with Isonate 143L was about 8° C. (10A) and 15° C. (10B), while the control sample had only about a 0.6° C. rise.

To determine the stability of the polyurea-modified polyol, the Brookfield viscosity was determined before and after aging for two months at 23° C. The polyurea-modified polyol was prepared as described above except 329.54 g of Polyol 3 was blended with 72.09 g of Jeffamine BuD-2000. An additional 47.66 g of styrene monomer was added to the system to achieve a 65 percent NVM based on polyol/styrene weight. To the mixture was added 0.90 g of DEA. The Brookfield viscosity was measured at 25° C. at a speed of 20 rpms. The Brookfield viscosity at time T=0 days was 2,800 cps, while at T=63 days, the viscosity was 2,640 cps.

TABLE 10

Properties of Polyurea-Modified Hybrid Resin Containing a Urea-Terminated, Polyether-Modified Polyol 3

| FORMULATIONS (Grams) | 10A | 10B | (Control) 10C |
|---|---|---|---|
| Polyol 3 | 191.88 | 177.39 | 208.2 |
| Isonate 143L | 57.1 | 55.72 | 58.86 |
| Jeffamine BuD2000 | 20.64 | 38.8 | 0.0 |
| BPO | 2.2 | 2.03 | 2.37 |
| DEA | 0.44 | 0.41 | 0.48 |
| Styrene | 27.75 | 25.65 | 30.1 |

TABLE 10-continued

Properties of Polyurea-Modified Hybrid Resin Containing a Urea-Terminated, Polyether-Modified Polyol 3

| FORMULATIONS (Grams) | 10A | 10B | (Control) 10C |
|---|---|---|---|
| Percent Polyamine in Hybrid | 6.9% | 12.9% | 0.0% |
| Linear Shrinkage (Mils/In) | | | |
| RT Cured | 1.8 | 2.0 | 11.7 |
| RT + 2 Hrs. @ 105° C. | 5.8 | 4.9 | 11.1 |
| Shore D Hardness | | | |
| RT* Cured | 79.0 | 78.0 | 82.0 |
| RT + 2 Hrs. @ 105° C. | 83.0 | 80.0 | 85.0 |
| Gel Times** (Minutes) | 8.0 | 6.0 | 24.0 |
| Exotherm Profile (°C.) | | | |
| Initial Temperature | 21.8 | 21.4 | 21.4 |
| Temperature @ 2 Minutes | 29.7 | 36.4 | 22.0 |
| Temperature Increase | 7.9 | 15.0 | 0.6 |
| Tg °C. via DMA - E' | 90.7/−59.6 | 87.6/−50.2 | 88.2 |

*RT = Room temperature (approximately 23° C.)
**A sample was prepared containing only 75 g of system. Take above formula and multiply by 0.25 to get 75 g of system.

EXAMPLE 10

Shrink Control Properties of Hybrid Resins Containing a Primary/Secondary, Amine-Based Polyether Modified Polyol Polyol 3 having a hydroxyl equivalent weight of 508 at an NVM of 74.4 percent, was diluted with styrene monomer until a 65 percent NVM was achieved. To the polyol was added 0.2 php of DEA. The polyol was then blended with a bis-hydroxypropyl derivative of Jeffamine D2000. The polyamine contains both primary and secondary amines plus some hydroxyl end groups. The total amine content was 0.963 meq/g of which 31.7 percent were secondary amines. The material had a viscosity at 25° C. of 444 cps and an amine equivalent weight of 1,038.

The following are the weights used to make the polyamine-modified polyol: 176.53 g of Polyol 3, 40.08 g of the polyamine, 23.51 g of styrene monomer and 0.40 g of DEA. After mixing the polyamine with the polyol, the polyol solution was allowed to deaerate for 10 mins before mixing with a stoichiometric amount of Isonate 143L (55.44 g) containing 1.0 php of BPO dissolved in like amount of styrene monomer. The NCO:NH ratio was 10:1 and the NCO:OH ratio was 1.1:1.0 while the NCO:(OH+NH) ratio was 1. The polyamine-modified polyol was clear on mixing but turned opaque when mixed with Isonate 143L. Following the Example 1 procedure, the morphology was identified as having two phases.

A total of 300 g of system was prepared, and the shrinkage was determined. The shrinkage of the opaque casting after 24 hrs of room temperature cure was 7.5 mils/in, and its Shore D hardness was 78. Note that the shrinkage is about 35 percent less than the control sample shown in Table 10 (10C).

EXAMPLE 11

Shrink Control Properties of Hybrid Resins Containing Polytetrahydrofuran-Based Polyamines Polyol 3 having a hydroxyl equivalent weight of 508 at an NVM of 74.4 percent, was diluted with styrene monomer until a 65 percent NVM was achieved. To the polyol was added 0.2 php of DEA. The polyol was then blended with a bis-(3-aminopropyl)-polytetrahydrofuran (BAP-PTHF) manufactured by BASF. The BAP-PTHF material was a wax at room temperature. It was heated to about 80° C. before mixing with the polyol. The polyamine contains primary amine end groups and has an amine equivalent weight of about 1,050.

The following are the weights used to make the polyamine-modified polyol: 176.25 g of Polyol 3, 40.48 g of the polyamine, 23.47 g of styrene monomer and 0.40 g of DEA. After mixing the polyamine with the polyol, the polyol solution was allowed to deaerate for 10 mins before mixing with a stoichiometric amount of Isonate 143L (55.36 g) containing 1.0 php of BPO dissolved in an equal amount of styrene monomer. The NCO:NH ratio was 10:1 and the NCO:OH ratio was 1.1:1.0, while the stoichiometric index NCO:(NH+OH) ratio was 1.

Following the Example 1 procedure, a two phase morphology was observed. A total of 300 g of system was prepared, and the shrinkage was determined. The shrinkage of the opaque casting after 24 hrs of room temperature cure was 5.3 mils/in, and its Shore D hardness was 78. Note that the shrinkage is about 54 percent less than the control sample of Table 10 (10C).

The gel time of the polyamine-modified hybrid was 9 mins. The temperature rise after the first 30 sec of mixing the polyamine-modified polyol with Isonate 143L was about 5.5° C.

EXAMPLE 12

Hybrid Resins Containing Polyols Modified with Amine-Terminated Butadiene-Acrylonitrile Copolymers Polyol 3 having a hydroxyl equivalent weight of 508 at an NVM of 74.4 percent, was diluted with styrene monomer until a 65 percent NVM was achieved. To the polyol was added 0.2 php of DEA. The polyol was then blended with an amine-terminated butadiene-acrylonitrile copolymer having an amine equivalent weight of 965. The polyamine is sold by BF Goodrich under the trade name Hycar 1300X16. Hycar 1300X16 is an unsaturated polyamine having secondary amine end groups. Hycar 1300X16 has a Brookfield viscosity at 27° C. of 200,000 cps and has an acrylonitrile content of 16 percent.

The following are the weights used to make the polyamine-modified polyol: 178.20 g of Polyol 3, 37.61 g of the polyamine, 23.73 g of styrene monomer and 0.41 g of DEA. After mixing the polyamine with the polyol, the polyol solution was allowed to deaerate for 10 mins before mixing with Isonate 143L (55.97 g) containing 1.0 php of BPO dissolved in an equal amount of styrene monomer. The NCO:NH ratio was 10:1 and the NCO:OH ratio was 1.1:1.0 while the NCO:(OH+NH) ratio was 1. The polyamine-modified polyol turned from clear to opaque when Isonate 143L was added. Following the procedure of Example 1, a two phase morphology was observed.

No shrinkage measurements were determined from this system due to the rapid rise in viscosity when the polyamine-modified polyol was mixed with the polyisocyanate. The inability to measure shrinkage is not a drawback of the hybrid system but of the test used to measure shrinkage. Fast gel times are an advantage during molding especially during compression molding or liquid molding and result in faster cycle times.

EXAMPLE 13

Polyamine Chain Extenders

The use of aromatic or aliphatic amine chain extenders can further reduce the gel time and increase the in situ polyurea formation within the polyol/polyisocyanate reaction medium. A polyamine-modified polyol was prepared by blending: 1 g of 4,9-dioxadodecane, 1,12-diamine with 41.9 g of Polyol 3. To this polyol was added 6.77 g of styrene monomer, and 0.2 php of DEA. To this polyamine polyol was added 9.94 g of Jeffamine D2000 of Example 1 resulting in a clear solution. The polyamine polyol containing two aliphatic diamines was then deaerated for 10 mins and then mixed with 14.27 g of Isonate 143L containing 1.0 php of benzoyl peroxide dissolved in an equal amount of styrene monomer. The gel time, initial temperature rise and morphology of the reaction were determined. The gel time was determined to be 8 mins, the initial temperature rise after 30 sec of mixing the polyamine-modified polyol with the polyisocyanate was 13.7° C. The hybrid had a two phase morphology. A similar two phase morphology was seen when the aliphatic diamine chain extender was replaced with an aromatic diamine such as diethyltoluenediamine.

EXAMPLE 14

Influence of Amine Equivalent Weight on Two-Phase Morphology

Polyol 3 was diluted with styrene monomer until an NVM of 65 percent was achieved. To the polyol/styrene solution was added 0.2 php of DEA. Various levels of Jeffamine D2000 and D400 were blended to achieve amine equivalent weights of 400, 500 and 600 g/amine equivalent. These polyamine blends were mixed into the polyol to achieve a constant NCO:NH equivalent ratio of 90:10. The polyamine-modified polyols were then deaerated for 10 mins and then mixed with a stoichiometric amount of polyisocyanate containing 1.0 php of benzoyl peroxide dissolved in an equal amount of styrene. The NCO:NH ratio was 10:1 and the NCO:OH ratio was 1.1:1.0 while the NCO:(OH+NH) ratio was 1 for all samples. All of the polyamine-modified polyols were clear.

After mixing the polyamine-modified polyol with the polyisocyanate, the gel time, initial temperature rise and morphology were determined. The gel time and temperature rise of the reaction mixture are reported in Table 11. Samples 11C, 11D and 11E exhibited a two phase morphology when observed at 200×. Sample 11B morphology was difficult to determine at 200× although the hybrid solution was slightly opaque. Sample 11A was clear, and only a single phase was observed at 200×.

The above results reveal that the polyamine concentration in the polyol must be sufficient to achieve a two phase morphology when reacted with the polyisocyanate. The critical polyamine concentration will vary depending on the gel time of the system, the functionality of the polyamine, the equivalent weight of the polyamine and the functionality of the polyisocyanate.

TABLE 11

| Hybrid Morphology Containing Polyoxypropylenediamine | | | | | |
|---|---|---|---|---|---|
| FORMULATIONS (Grams) | 11A | 11B | 11C | 11D | 11E |
| Polyol 3 | 48.02 | 46.63 | 45.97 | 45.33 | 42.93 |
| Isonate 143L | 15.96 | 15.5 | 15.28 | 15.07 | 14.27 |
| Jeffamine D2000 | 0.0 | 1.08 | 3.0 | 3.15 | 9.94 |
| Jeffamine D400 | 2.22 | 3.24 | 3.33 | 3.15 | 0.0 |
| BPO | 0.56 | 0.55 | 0.54 | 0.53 | 0.5 |
| DEA | 0.11 | 0.11 | 0.11 | 0.11 | 0.1 |
| Styrene | 8.13 | 7.9 | 7.78 | 7.67 | 7.26 |
| Average AEW* (g/equiv.) | 200 | 400 | 500 | 600 | 1000 |
| Equivalent Ratio (OH:NH) | 90:10 | 90:10 | 90:10 | 90:10 | 90:10 |
| Percent Polyamine in Hybrid | 3.0% | 5.8% | 7.1% | 8.4% | 13.3% |
| Morphology @ 200X | Single Phase | Single Phase | Two Phase | Two Phase | Two Phase |
| Hybrid Solution | Clear | Slightly Opaque | Slightly Opaque | Opaque | Opaque |
| Gel Time (Minutes) | 11 | 7 | 7 | 7 | 12 |
| Exotherm Profile (°C.) | | | | | |
| Initial Temperature | 23.2 | 24.6 | 24.8 | 25.2 | 22.7 |
| Temperature @ 2 Minutes | 30.4 | 36.0 | 37.5 | 37.2 | 30.4 |
| Temperature Increase | 7.2 | 11.4 | 12.7 | 12.0 | 7.7 |

*Amine equivalent weight was calculated by multiplying the weight fraction of Jeffamine D400 and D2000 by the equivalent weight of D400 (AEW 200) and D2000 (AEW 1000).

That which is claimed is:

1. A polyester-polyurethane molding composition having a first, soft polyurea phase within a second, more rigid polyester-polyurethane phase, formed by the reaction of:
    an A side composition comprising a polyfunctional isocyanate compound and a free radical polymerization catalyst; and
    a B side composition comprising a mixture of (i) an ethylenically unsaturated monomer solution having dissolved therein about 40–90 weight percent of a substantially waterfree, unsaturated polyester polyol having at least one dicarboxylic alkene moiety and an acid number less than five; and (ii) a polyfunctional nitrogen-containing compound having at least one active hydrogen atom on each of at least two nitrogen atoms in each molecule, which, when reacted with the A side composition, has a molecular weight sufficient to form the first, soft polyurea phase;
wherein the ratio of active NCO groups of the isocyanate to NH groups of the nitrogen-containing compound is between about 3:1 and about 100:1, the ratio of active NCO groups to active OH groups in the polyester polyol is between about 0.5:1 and about 6:1, such that the stoichiometric index NCO:(NH+OH) is between about 0.5 and about 2.0.

2. The molding composition of claim 1, wherein the composition comprises about 10–30 weight percent isocyanate, about 35–85 weight percent polyester polyol in monomer solution and about 5–35 weight percent nitrogen-containing compound.

3. The molding composition of claim 1, wherein the nitrogen-containing compound comprises a polyoxyalkylene having two or more terminal amino groups.

4. The molding composition of claim 3, wherein the polyoxyalkylene has a molecular weight of between about 1000 and about 4000.

5. The molding composition of claim 3, wherein the polyoxyalkylene is selected from the group consisting of polyoxypropylenediamine, a urea-terminated polyoxypropylene, polytetramethyleneoxide-di-p-aminobenzoate and bis-(3-aminopropyl)-polytetrahydrofuran and mixtures thereof.

6. The molding composition of claim 1, wherein the nitrogen-containing compound comprises a polyorganosiloxane having two or more terminal amino groups.

7. The molding composition of claim 1, wherein the nitrogen-containing compound comprises a conjugated diene acrylonitrile copolymer having two or more terminal amino groups.

8. The molding composition of claim 1, wherein the ethylenically unsaturated monomer solution comprises styrene, and the polyester polyol comprises a reaction product of at least one of a saturated di- or polycarboxylic acid or anhydride and an unsaturated di- or polycarboxylic acid or anhydride with a polyhydric alcohol or glycol.

9. The molding composition of claim 8, wherein the saturated di- or polycarboxylic acid or anhydride comprises isophthalic acid, the unsaturated di- or polycarboxylic acid or anhydride comprises maleic anhydride, and the polyhydric alcohol or glycol is selected from the group consisting of diethylene glycol, ethylene glycol and neopentyl glycol and mixtures thereof.

10. The molding composition of claim 1, wherein the ethylenically unsaturated monomer solution comprises styrene, and the polyester polyol comprises a reaction product of an unsaturated di- or polycarboxylic acid or anhydride with a polyhydric alcohol or glycol.

11. The molding composition of claim 1, wherein the nitrogen-containing compound further comprises an amine chain extender.

12. The molding composition of claim 11, wherein the amine chain extender comprises diethyltoluenediamine.

13. The molding composition of claim 1, and a fibrous reinforcement, filler or mixture thereof.

14. The molding composition of claim 1, wherein the ratio of NCO to NH is between about 10:1 and about 20:1, the ratio of NCO to OH is between about 0.8:1 and about 1.5:1, such that the stoichiometric index NCO:(NH+OH) is between about 0.8 and about 1.2.

15. The molding composition of claim 1, wherein the first, soft polyurea phase has a glass transition temperature lower than that of the second, more rigid polyester-polyurethane phase.

16. The molding composition of claim 1, wherein the first, soft polyurea phase has a glass transition temperature below 0° C.

17. The molding composition of claim 1, wherein the first, soft polyurea phase is dispersed within the second, more rigid polyester-polyurethane phase and the polyurea phase comprises particles of less than about 25 μ.

18. The molding composition of claim 1, wherein the B side further comprises a urethane catalyst.

19. A process for making a polyester-polyurethane molding composition having a first, soft polyurea phase within a second, more rigid polyester-polyurethane phase comprising reacting:

an A side composition comprising a polyfunctional isocyanate and a free radical polymerization catalyst; and a B side composition comprising a mixture of:

(i) An ethylenically unsaturated monomer solution having dissolved therein about 40–90 weight percent of a substantially water-free, unsaturated polyester polyol having at least one dicarboxylic alkene moiety and having an acid number less than five; and (ii) A polyfunctional nitrogen-containing compound having at least one active hydrogen atom on each of at least two nitrogen atoms in each molecule, which, when reacted with the A side composition, has a molecular weight sufficient to form the first, soft polyurea phase;

wherein the ratio of active NCO groups of the isocyanate to active NH groups of the nitrogen-containing compound is between about 3:1 and about 100:1, and the NCO groups to active OH groups of the polyester polyol is between about 0.5:1 and about 6:1, such that the stoichiometric index NCO:(NH+OH) is between about 0.5 and about 2.0.

20. A polyester-polyurethane hybrid resin molding system comprising:

an A side composition comprising a polyfunctional isocyanate and a free radical polymerization catalyst; and a B side composition comprising a mixture of:

(i) An ethylenically unsaturated monomer solution having dissolved therein about 40–90 weight percent of a substantially water-free, unsaturated polyester polyol having at least one dicarboxylic alkene moiety and having an acid number less than five; and (ii) A polyfunctional nitrogen-containing compound having at least one active hydrogen atom on each of at least two nitrogen atoms in each molecule, which, when reacted with the A side composition has a molecular weight sufficient to form a first, soft polyurea phase;

wherein, when the A and B side compositions are reacted and then cured, a molding composition is formed having the first, soft polyurea phase within a second, more rigid polyester-polyurethane phase, and wherein the ratio of active NCO groups of the isocyanate to active NH groups of the nitrogen-containing compound is between about 3:1 and about 100:1, and the NCO groups to active OH groups of the polyester polyol is between about 0.5:1 and about 6:1, such that the stoichiometric index NCO:(NH+OH) is between about 0.5 and about 2.0.

* * * * *